US012428337B2

(12) United States Patent
Gao et al.

(10) Patent No.: US 12,428,337 B2
(45) Date of Patent: Sep. 30, 2025

(54) METHOD FOR MANUFACTURING ULTRA-THIN GLASS SUBSTRATE, ULTRA-THIN GLASS SUBSTRATE, AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yongxiao Gao, Beijing (CN); Tiejun Bi, Beijing (CN); Shiyou Wang, Beijing (CN); Qiang Tang, Beijing (CN); Xiaolin Xu, Beijing (CN); Zheng Fang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/029,428

(22) PCT Filed: May 31, 2022

(86) PCT No.: PCT/CN2022/096158
§ 371 (c)(1),
(2) Date: Mar. 30, 2023

(87) PCT Pub. No.: WO2023/230815
PCT Pub. Date: Dec. 7, 2023

(65) Prior Publication Data
US 2024/0360030 A1 Oct. 31, 2024

(51) Int. Cl.
C03C 15/00 (2006.01)
C03B 33/02 (2006.01)
C03C 21/00 (2006.01)

(52) U.S. Cl.
CPC .......... *C03C 15/00* (2013.01); *C03B 33/0222* (2013.01); *C03C 21/002* (2013.01)

(58) Field of Classification Search
CPC ..... C03B 33/00; C03B 33/02; C03B 33/0222; C03B 33/023; C03C 15/00; C03C 19/00; C03C 21/00; C03C 21/001; C03C 21/002
See application file for complete search history.

(56) References Cited

U.S. PATENT DOCUMENTS

2022/0064061 A1* 3/2022 Da .......................... C03C 3/085

FOREIGN PATENT DOCUMENTS

CN 112456766 A 3/2021
CN 112876089 A 6/2021
(Continued)

*Primary Examiner* — Zachary M Davis
(74) *Attorney, Agent, or Firm* — WHDA, LLP

(57) ABSTRACT

The present disclosure provides a method for manufacturing an ultra-thin glass substrate, including: providing a large glass sheet including a plurality of to-be-cut glass substrates, each to-be-cut glass substrate including a bendable region and a non-bendable region arranged at two sides of the bendable region along a first direction; cutting each to-be-cut glass substrate along an edge of the bendable region to form two slits arranged opposite to each other; performing a double-sided thinning operation on the large glass sheet, and performing an edge etching operation on the edge of the bendable region; cutting each to-be-cut glass substrate along an edge of the non-bendable region through a laser to obtain a glass substrate; performing a chemical tempering operation on the glass substrate; and performing micro-etching treatment on a surface of the chemically-tempered glass (Continued)

substrate. The present disclosure further provides the ultra-thin glass substrate and a display device.

20 Claims, 5 Drawing Sheets

(56) References Cited

FOREIGN PATENT DOCUMENTS

| | | |
|---|---|---|
| CN | 112919818 A | 6/2021 |
| CN | 113582553 A | 11/2021 |
| KR | 101620375 B1 | 5/2016 |

* cited by examiner

METHOD FOR MANUFACTURING ULTRA-THIN GLASS SUBSTRATE, ULTRA-THIN GLASS SUBSTRATE, AND DISPLAY DEVICE

CROSS-REFERENCE TO RELATED APPLICATION

This application is the U.S. national phase of PCT Application No. PCT/CN2022/096158 filed on May 31, 2022, the entire contents of which are hereby incorporated by reference.

TECHNICAL FIELD

The present disclosure relates to the manufacture of a display product, in particular to an ultra-thin glass substrate, a manufacturing method thereof, and a display device.

BACKGROUND

Ultra-thin glass products on a cover plate of a foldable smart phone are produced and processed through relatively complicated processes at a low yield, resulting in high cost. The processing of an ultra-thin glass element in the related art includes thinning a large glass plate, laser-cutting, dispensing, laminating, edge treatment, adhesive removal, separating, chemical tempering, surface etching optimization and ultrasonic washing.

As a most time-consuming process, the edge treatment aims to obtain a sample through cutting and optimize an edge of the sample with burr. An existing edge treatment process includes dispensing, laminating, curing, edge etching, adhesive removal and separating. In general, there exist the following defects in the existing edge treatment process.

1. An adhesive for lamination needs to have very strong acid-proof performance, and needs to be drenched by or soaked in a thinning liquid for several hours without any loss of viscosity. An acid itself is corrosive to human body, and a relatively large damage is caused to an operator during the dispensing. Furthermore, too many parameters are involved in the dispensing, e.g., an outflow order, a trajectory, a volume and a position of the acid-proof adhesive. Due to the mutual influence among various factors, when there is a tiny change in one parameter, the subsequent process may be affected remarkably.

2. Due to the limitation of the dispensing process, the acid-proof adhesive may remain on surfaces of upper and lower glass sheets after the dispensing. When the edge of the glass sheet is cut by Computer Numerical Control (CNC), a part of the adhesive may flow from the surface to an end surface. At this time, a part of the glass sheet is shielded by the acid-proof adhesive and thereby is not sufficiently etched in the chemical etching process, resulting in such a poor appearance as uneven edge, which accounts for about 2.3% of the total defects.

3. A thickness of the glass sample for the edge treatment is merely 30 µm to 100 µm, and the equipment accuracy is highly demanded in the CNC process. The edge is greatly affected by such parameters as a feeding speed, an air pressure, a lower cutter pressure, a cutter wheel angle and a cutting fluid concentration. Even in the case of a slight change in these parameters, such poor appearances as broken edge and missing parts may easily occur for the ultra-thin glass sheet, which accounts for about 4.5% of the total defects.

4. In the chemical etching process, an adhesive force of a part of the adhesive decreases in a strong acidic environment, so a part of the acid penetrates into a surface of the ultra-thin glass sheet, resulting a non-uniform thickness of the ultra-thin glass sheet, which accounts for about 4.8% of the total defects.

5. In the separation process, the acid-proof adhesive is debonded and separated from the ultrathin glass sheet. The sample obtained after the edge etching is placed in an Ultra-Violet (UV) environment with an ultra-strong luminance, and after the failure of the adhesive, the sample still needs to be soaked in constant-temperature water for several hours, so that the adhesive is separated from the ultra-thin glass sheet. Currently, the debonding and separation are performed manually rather than by a robot arm. In addition, the glass sheet is not tempered, so it may be easily broken duration the debonding and separation, which accounts for 18.6% of the total defects.

SUMMARY

An object of the present disclosure is to provide an ultra-thin glass substrate, a manufacturing method thereof, and a display device, so as to simplify the edge process on the ultra-thin glass substrate and improve the yield.

In one aspect, the present disclosure provides in some embodiments a method for manufacturing an ultra-thin glass substrate, including: providing a large glass sheet including a plurality of to-be-cut glass substrates, each to-be-cut glass substrate including a bendable region and a non-bendable region arranged at two sides of the bendable region along a first direction; cutting each to-be-cut glass substrate along an edge of the bendable region to form two slits arranged opposite to each other; performing a double-sided thinning operation on the large glass sheet, and performing an edge etching operation on the edge of the bendable region; cutting each to-be-cut glass substrate along an edge of the non-bendable region through a laser to obtain a glass substrate; performing a chemical tempering operation on the glass substrate; and performing micro-etching treatment on a surface of the chemically-tempered glass substrate.

In a possible embodiment of the present disclosure, a length of the bendable region in the first direction is a distance between a stress starting point and a stress ending point when the to-be-cut glass substrate is bent.

In a possible embodiment of the present disclosure, in the cutting each to-be-cut glass substrate along the edge of the bendable region to form the two slits arranged opposite to each other, a length of the slit in the first direction is greater than or equal to a length of the bendable region in the first direction.

In a possible embodiment of the present disclosure, each of two ends of each slit extend by 8 mm to 12 mm toward the corresponding non-bendable region.

In a possible embodiment of the present disclosure, the cutting each to-be-cut glass substrate along the edge of the bendable region to form the two slits arranged opposite to each other includes cutting each to-be-cut glass substrate along each edge of the bendable region through a laser to form the slit including a plurality of sub-slits extending along the first direction and spaced apart from each other.

In a possible embodiment of the present disclosure, in the cutting each to-be-cut glass substrate along the edge of the bendable region to form the two slits arranged opposite to each other, the laser has power of 30 W to 60 W and a pulse spacing of 1 µm to 6 µm to generate a laser beam at a wavelength of 532 nm to 1064 nm.

In a possible embodiment of the present disclosure, in the performing the double-sided thinning operation on the large glass sheet and performing the edge etching operation on the edge of the bendable region, the entire large glass sheet is thinned through spraying an acid solution, and the plurality of sub-slits in each slit is in communication with each other.

In a possible embodiment of the present disclosure, in the performing the double-sided thinning operation on the large glass sheet and performing the edge etching operation on the edge of the bendable region, an angle between a surface and a side surface of the bendable region is a rounded angle.

In a possible embodiment of the present disclosure, in the performing the double-sided thinning operation on the large glass sheet and performing the edge etching operation on the edge of the bendable region, the acid solution is hydrofluoric acid.

In a possible embodiment of the present disclosure, the chemical tempering operation is an exchange process of sodium and potassium ions at a high temperature, and surface strength and flexibility of the glass substrate are increased through a squeezing effect generated due to a volume difference between the sodium and potassium ions.

In a possible embodiment of the present disclosure, the performing the micro-etching treatment on the surface of the chemically-tempered glass substrate includes performing the micro-etching treatment on the surface of the chemically-tempered glass substrate so as to passivate sharp microcracks on the surface and edge of the glass substrate.

In another aspect, the present disclosure provides in some embodiments an ultra-thin glass substrate manufactured through the above-mentioned method.

In yet another aspect, the present disclosure provides in some embodiments a display device including a cover plate made of the above-mentioned ultra-thin glass substrate.

According to the embodiments of the present disclosure, it is able to simplify the manufacture of the ultra-thin glass substrate, thereby to reduce the manufacture cost and improve the yield.

DETAILED DESCRIPTION

Figure 1:
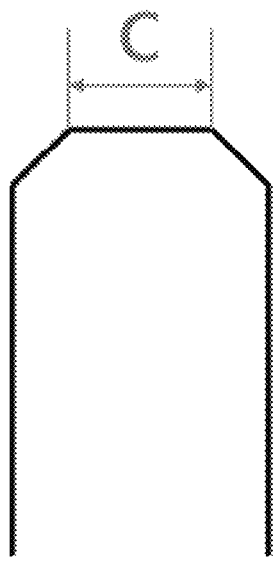
FIG. 1 is a schematic view showing a processing effect at an edge of an ultra-thin glass product.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, such words as "in the middle of", "under/below", "front", "back", "vertical", "horizontal", "top", "bottom", "inside" and "outside" are used to indicate directions or positions as viewed in the drawings, and they are merely used to facilitate the description in the present disclosure, rather than to indicate or imply that a device or member must be arranged or operated at a specific position. In addition, such words as "first" and "second" are merely used to differentiate different components rather than to represent any order, number or importance.

Figure 2:
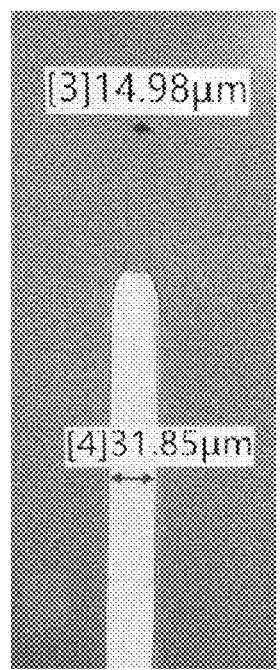
FIG. 2 is another schematic view showing the processing effect at the edge of the ultra-thin glass product.

For an ultra-thin glass (UTG) product, a time-consuming edge treatment process is used to treat an edge of the UTG product to achieve an effect as shown in FIG. 1. The experimental data shows that, a value of c in FIG. 1 plays a crucial role in the impact and bending strength of a sample. FIG. 2 shows an ideal value of c. When the value of c is too large, a large stress occurs at a joint between an end surface and a plane in a direction as shown in FIG. 1, so the UTG product may be easily broken at this joint in an ultimate bending test. When the value of c is too small, a stress may be concentrated at the joint, so the bending strength and the impact strength of the entire UTG product are adversely affected.

An object of the present disclosure is to provide a method for manufacturing an ultra-thin glass substrate, so as to provide an appropriate value of e and simplify the process as possible, thereby to improve the yield and reduce the manufacture cost.

Figure 3:
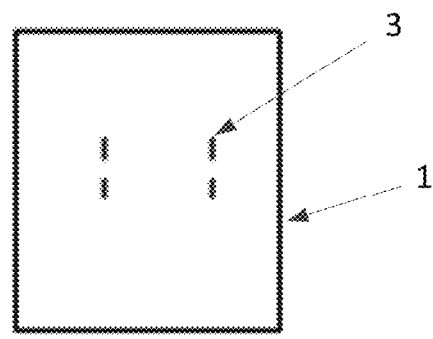
FIG. 3 is a schematic view showing a large glass sheet after cutting according to one embodiment of the present disclosure.
Figure 4:
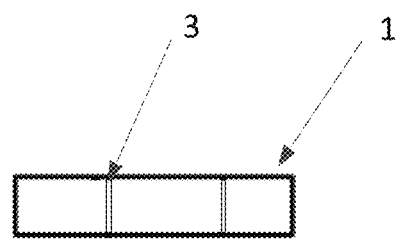
FIG. 4 a sectional view of the large glass sheet in FIG. 3.
Figure 5:
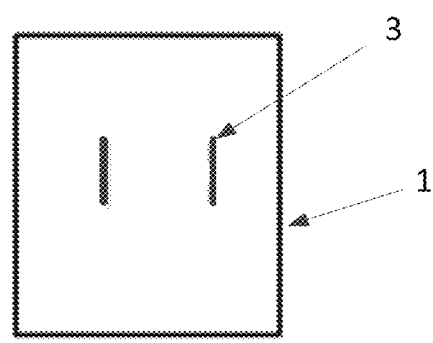
FIG. 5 is a schematic view showing the large glass substrate after thinning according to one embodiment of the present disclosure.
Figure 6:
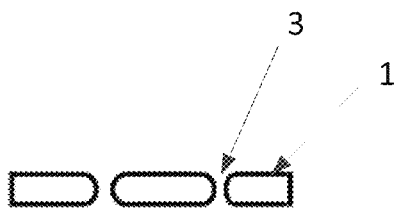
FIG. 6 is a sectional view of the glass sheet in FIG. 5.
Figure 7:
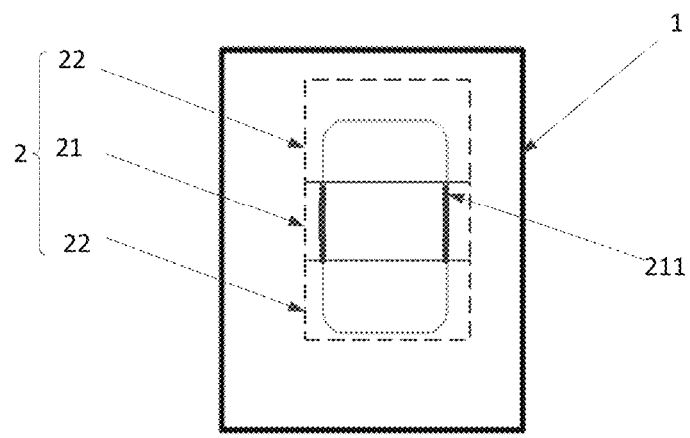
FIG. 7 is a schematic view showing the large glass sheet when a glass substrate is cut according to one embodiment of the present disclosure.

With reference to FIGS. 3 to 12, the present disclosure provides in some embodiments a method for manufacturing an ultra-thin glass substrate 2 in the present embodiment, which includes: providing a large glass sheet including a plurality of to-be-cut glass substrates 2, each to-be-cut glass substrate including a bendable region 21 and a non-bendable region 22 arranged at two sides of the bendable region 21 along a first direction; cutting each to-be-cut glass substrate along an edge of the bendable region 21 to form two slits arranged opposite to each other (as shown in FIGS. 3 and 4, where FIG. 4 is a sectional view of the large glass sheet at the bendable region in FIG. 3); performing a double-sided thinning operation on the large glass sheet, and performing an edge etching operation on the edge of the bendable region 21 (as shown in FIGS. 5 and 6, where FIG. 6 is a sectional view of the large glass sheet at the bendable region in FIG. 5); cutting each to-be-cut glass substrate 2 along an edge of the non-bendable region 22 through a laser to obtain the glass substrate 2 (as shown in FIG. 7); performing a chemical tempering operation on the glass substrate 2; and performing micro-etching treatment on a surface of the chemically-tempered glass substrate 2.

In the embodiments of the present disclosure, the UTG machining process is simplified. Especially in the edge treatment process, such processes as dispensing and laminating are replaced with a laser cutting process and an etching process, i.e., the edge of the bendable region 21 is etched for the first time during the thinning, and then etched for the second time during the micro-etching after the chemical tempering. In this way, it is able to provide the bendable region 21 with a rounded angle, improve the impact strength and the bending performance, and increase the yield from 47.2% to 91.4%.

According to the embodiments of the present disclosure, on one hand, it is unnecessary to provide an acid-proof adhesive, so it is able to reduce the manufacture cost. On the other hand, it is able to simplify the process, thereby to improve the first pass yield.

In addition, as compared with the dispensing and laminating processes where a glass sheet having a thickness of 70 µm is thinned, in the embodiments of the present disclosure, a thicker, cheaper glass sheet is used. The smaller the thickness, the higher the requirement on a molding process, so when the thickness of the glass sheet is smaller than 400 µm, its price increases dramatically along with a decrease in the thickness. For example, the glass sheet having a thickness of 145 µm, 175 µm, 200 µm, 330 µm or 400 µm is cheaper than the glass sheet having a thickness of 70 µm while ensuring the performance. In the embodiments of the present disclosure, when the thicker glass sheet is used, the edge of the bendable region may be etched at a larger etching amount in the etching process after the formation of the slits (i.e., in the step of performing the double-sided thinning operation on the large glass sheet and performing the edge etching operation on the edge of the bendable region), so it is able to provide the bendable region with a rounded edge, thereby to improve the bending performance. In addition, the slits may also be formed when the thickness of the glass sheet is reduced to 170 µm to 190 µm. Due to the introduction of the thick glass sheet, there is still room for further reducing the manufacture cost.

Illustratively, a length of the bendable region 21 in the first direction is a distance between a stress starting point and a stress ending point when the to-be-cut glass substrates 2 is bent.

Illustratively, in the cutting each to-be-cut glass substrate along the edge of the bendable region 21 to form the two slits arranged opposite to each other, a length of the slit in the first direction is greater than or equal to a length of the bendable region 21 in the first direction.

Illustratively, each of two ends of each slit extends by 8 mm to 12 mm toward the corresponding non-bendable region 22. For example, in a possible embodiment of the present disclosure, each end of each slit extends by, but not limited to, 10 mm toward the corresponding non-bendable region 22.

Referring to FIGS. 3 to 7, the cutting each to-be-cut glass substrate along the edge of the bendable region 21 to form the two slits arranged opposite to each other includes cutting each to-be-cut glass substrate along each edge of the bendable region 21 through a laser to form the slit 3 including a plurality of sub-slits 31 extending along the first direction and spaced apart from each other.

With reference to FIGS. 3 and 4, each slit includes a plurality of sub-slits in the first direction, and extends through the large glass sheet in a thickness direction of the large glass sheet.

Illustratively, in the cutting each to-be-cut glass substrate 2 along the edge of the bendable region 21 to form the two slits 3 arranged opposite to each other, the laser has power of 30 W to 60 W and a pulse spacing of 1 µm to 6 µm to generate a laser beam at a wavelength of 532 nm to 1064 nm.

In a possible embodiment of the present disclosure, the wavelength is 1064 nm, the power is 45 W and the pulse spacing is 2 µm.

In a possible embodiment of the present disclosure, the large glass sheet 1 has a thickness of, but not limited to, 170 µm.

With reference to FIG. 4, illustratively, in the performing the double-sided thinning operation on the large glass sheet 1 and performing the edge etching operation on the edge of the bendable region 21, the entire large glass sheet is thinned through spraying an acid solution, and the plurality of sub-slits 31 in each slit 3 is in communication with each other.

Taking a UTG product having a target thickness of 30 µm (i.e., a thickness of the glass substrate 2) as an example, when the large glass sheet has a thickness of 170 µm to 190 µm during the formation of the slits, it is able to obtain an ideal edge in the subsequent thinning and etching processes. When the thickness is too large, the etching amount is too large and the value of c is too small, and vice versa. In a possible embodiment of the present disclosure, the double-sided thinning operation is performed on the large glass sheet so as to reduce its thickness from 170 µm to, but not limited to, 32 µm. The edge etching operation is performed on the edge of the bendable region 21. FIG. 6 is a sectional view of the to-be-cut glass substrate 2 of the large glass sheet, and it shows the edge of the bendable region 21 of the glass substrate 2 after the etching.

Figure 9:
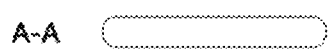
FIG. 9 is a sectional view of the glass substrate along line A-A in FIG. 8.

FIG. 6 is a sectional view of the large glass sheet when the glass substrate is not separated therefrom, and FIG. 9 is a sectional view of the bendable region of the glass substrate after it is separated from the large glass sheet.

Illustratively, in the performing the double-sided thinning operation on the large glass sheet and performing the edge etching operation on the edge of the bendable region 21, an angle between a surface and a side surface of the bendable region 21 is a rounded angle.

Illustratively, in the performing the double-sided thinning operation on the large glass sheet and performing the edge etching operation on the edge of the bendable region, the acid solution is, but not limited to, hydrofluoric acid.

Hydrofluoric acid reacts with silicon dioxide on the surface of the glass substrate to generate fluorosilicic acid, so as to thin the glass substrate. In this step, when hydrofluoric acid flows through the slits (i.e., the edge of the bendable region) so as to etch the angle between the surface and the side surface of the bendable region into a rounded angle, without any CNC engraving technology, nor such processes as dispensing and laminating.

It should be appreciated that, in a direction perpendicular to the surface of the large glass sheet, an etching rate for a part of the bendable region 21 subjected to the local laser treatment (i.e., the slit) is greater than an etching rate for a middle part of the bendable region 21. Due to the difference in the etching rates, it is able to obtain the desired edge.

Illustratively, the chemical tempering operation is an exchange process of sodium and potassium ions at a high temperature, and surface strength and flexibility of the glass substrate are increased through a squeezing effect generated due to a volume difference between the sodium and potassium ions. In a possible embodiment of the present disclosure, a plurality of glass substrates is placed in a tool made of polyvinyl chloride (PVC), and then a mixed solution containing water and one of hydrofluoric acid, nitric acid, sulfuric acid or ammonium fluoride is added, so as to etch the glass substrate at an etching rate of 0.5 to 1 µm/min and an etching amount of 1 µm. In addition, an ultrasonic device is used during the etching so as to prevent the occurrence of a clamp imprint on the glass substrate, remove residual glass sand on the surface of the glass substrate after the etching, ensure the thickness uniformity of the glass substrate, optimize the surface roughness of the glass substrate, effectively passivate the microcracks on the surface of the tempered glass substrate, and improve the impact strength of the surface of the glass substrate.

Illustratively, the performing the micro-etching treatment on the surface of the chemically-tempered glass substrate 2 includes performing the micro-etching treatment on the surface of the chemically-tempered glass substrate so as to passivate sharp microcracks on the surface and edge of the glass substrate, thereby to improve the strength of the glass substrate. Then, the glass substrate is subjected to ultrasonic washing to obtain the ultra-thin glass substrate.

After the etching, the thickness uniformity of the glass substrate is controlled to be within 1 μm. The etching amount is controlled to be 1 μm to 4 μm through controlling a concentration of the acid solution, an etching time and a temperature. When the etching amount is too small, it is difficult to fully remove the sharp microcracks on the surface of the UTG substrate, and when the etching amount is too large, such a phenomenon as slight warping may occur for the tempered UTG substrate. In addition, the etching rate is controlled to be 0.5 μm/min to 1 μm/min. When the etching rate is too small, the etching time may be too long and the working efficiency may be low, and when the etching rate is too large, serrations may easily occur for the edge and the UTG substrate may easily be broken.

The acid solution may be, but not limited to, hydrofluoric acid.

According to the method in the embodiments of the present disclosure, the conventional time-consuming edge treatment process (dispensing+lamination+curing+CNC+edge etching+separation) is replaced with an acid etching process after forming the slits for the bendable region 21 through the laser. There exist the following advantages in the embodiments of the present disclosure.

1. Based on actual production data, the yield of the conventional method including dispensing and lamination (the conventional process in table 1) and the method in the embodiments of the present disclosure is shown in Table 1.

TABLE 1 edge treatment processes and yield

| Conventional edge treatment process | Yield | Edge treatment process in the present disclosure | Yield |
|---|---|---|---|
| Large-sheet dispensing | 93% | Laser cutting | 98% |
| Line cutting | 89% | Thinning | 97% |
| CNC | 96% | Laser cutting | 96% |
| Edge etching | 91% | | |
| Separation | 73% | | |
| First pass yield | 53% | First pass yield | 91% |

As shown in Table 1, the first pass yield is remarkably increased from 53% to 91% through simplifying the process.

2. The production time is remarkably reduced. For the conventional process in Table 1, it takes about 18 hours to obtain a single lot (each lot includes several tens of samples), and for the process in the embodiments of the present disclosure, it merely takes 12 hours to obtain a single lot.

3. The laser cutting and thinning processes in the embodiments of the present disclosure may be performed through the same devices and fixtures for the conventional process, without any new devices.

Figure 11:
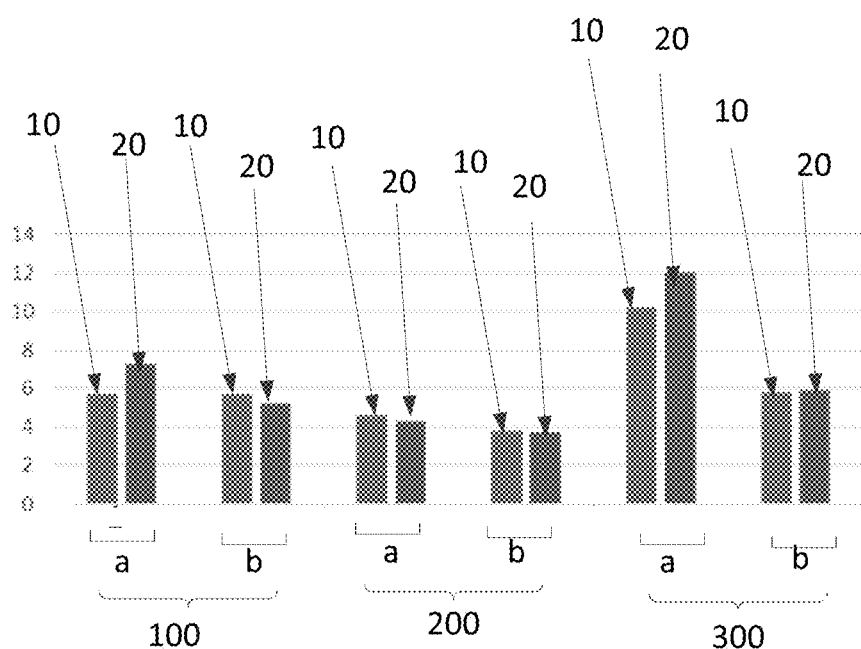
FIG. 11 is a compassion graph of an impact strength test.
Figure 12:
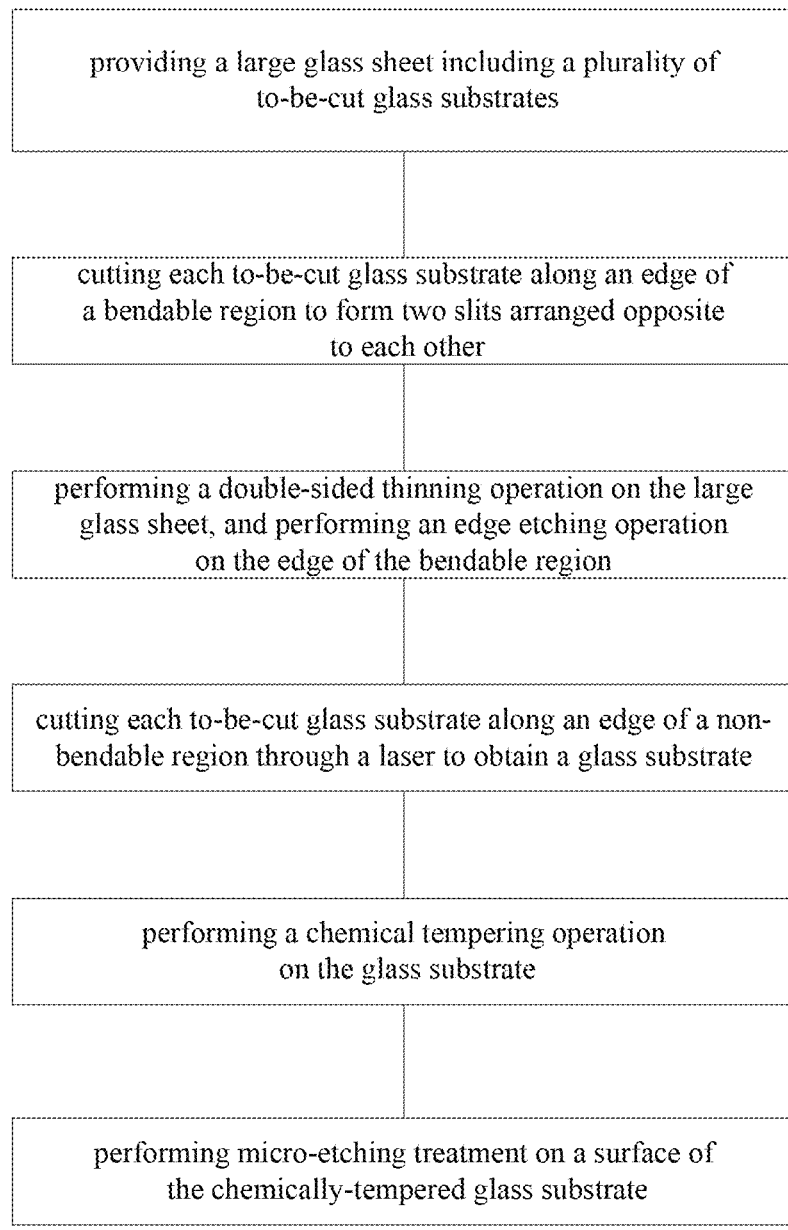
FIG. 12 shows a flow chart of a method for manufacturing an ultra-thin glass substrate according to one embodiment of the present disclosure.

Table 2 and FIG. 11 show comparative data for three samples, and average values at three points are obtained in a same region for each sample.

TABLE 2 testing data of the conventional process (including dispensing and lamination) and the process in the present disclosure

| Item | | Conventional process | Process in the present disclosure |
|---|---|---|---|
| Stack up | | 30 μm UTG | 30 μm UTG |
| Pen-dropping/cm | Non-bendable region 22 | 5.7 | 7.3 |
| | Bendable region 21 | 5.7 | 5.2 |
| Ball-dropping/cm | Non-bendable region 22 | 4.6 | 4.3 |
| | Bendable region 21 | 3.8 | 3.7 |
| Tip-crushing/kg | Non-bendable region 22 | 10.2 | 12 |
| | Bendable region 21 | 5.8 | 5.9 |
| Dynamic bending | | U-shaped R3 bending 5/5 Pass | U-shaped R3 bending 5/5 Pass |

In FIG. 11, 100 indicates the impact strength corresponding to a pen-dropping test, 200 indicates the impact strength corresponding to a ball-dropping test, 300 indicates the impact strength corresponding to a tip-crushing test, a indicates the non-bendable region 22, b indicates the bendable region 21, 10 indicates the impact strength of the ultra-thin glass substrate manufactured through the conventional process including dispensing and lamination, and 20 indicates the impact strength of the ultra-thin glass substrate manufactured through the method in the embodiments of the present disclosure.

Based on the above data, in the case of the stack-up of identical modules, the UTG product manufactured through the method in the embodiments of the present disclosure is the same as the UTG product manufactured through a bulk production process in terms of the impact strength and the bending strength.

Figure 8:
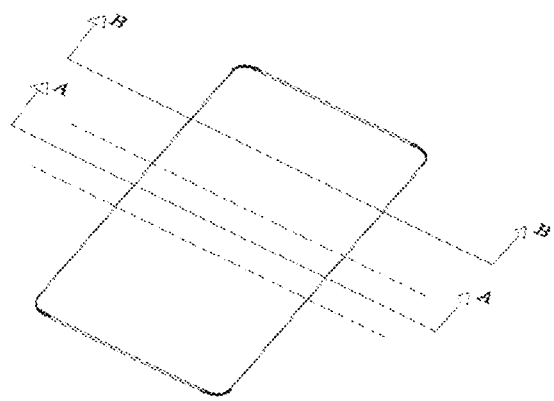
FIG. 8 is a schematic view showing the glass substrate.
Figure 10:
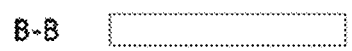
FIG. 10 is a sectional view of the glass substrate along line B-B in FIG. 8.

It should be appreciated that, FIG. 8 is a three-dimensional schematic view of the glass substrate 2, FIG. 9 is a sectional view of the glass substrate 2 along line A-A in the bendable region 21 (a region between two dotted lines), and FIG. 10 is sectional view of the glass substrate 2 along line B-B in the non-bendable region 22. The edge of the bendable region 21 in the direction A-A is a smooth rounded angle, and the edge of the non-bendable region 22 in the direction B-B is a right angle after a single laser cutting operation. Due to the rounded angle in the bendable region 21, it is able to prevent the concentration of the stress concentration, thereby to improve the bending strength.

It should be appreciated that, when the glass substrate 2 manufactured through the method in the embodiments of the present disclosure is applied to a stack-up structure, due to the smooth transition of the edge of the bendable region 21, it is able to improve the bending strength and the impact strength of the stack-up structure.

The present disclosure further provides in some embodiments an ultra-thin glass substrate manufactured through the above-mentioned method.

The present disclosure further provides in some embodiments a display device including a cover plate made of the above-mentioned ultra-thin glass substrate.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for manufacturing an ultra-thin glass substrate, comprising:
    providing a large glass sheet comprising a plurality of to-be-cut glass substrates, each to-be-cut glass substrate comprising a bendable region and a non-bendable region arranged at two sides of the bendable region along a first direction;
    cutting each to-be-cut glass substrate along an edge of the bendable region to form two slits arranged opposite to each other;
    performing a double-sided thinning operation on the large glass sheet, and performing an edge etching operation on the edge of the bendable region;
    cutting each to-be-cut glass substrate along an edge of the non-bendable region through a laser to obtain a glass substrate;
    performing a chemical tempering operation on the glass substrate; and
    performing micro-etching treatment on a surface of the chemically-tempered glass substrate.

2. The method according to claim 1, wherein a length of the bendable region in the first direction is a distance between a stress starting point and a stress ending point when the to-be-cut glass substrate is bent.

3. The method according to claim 1, wherein in the cutting each to-be-cut glass substrate along the edge of the bendable region to form the two slits arranged opposite to each other, a length of the slit in the first direction is greater than or equal to a length of the bendable region in the first direction.

4. The method according to claim 3, wherein each of two ends of each slit extend by 8 mm to 12 mm toward the corresponding non-bendable region.

5. The method according to claim 1, wherein the cutting each to-be-cut glass substrate along the edge of the bendable region to form the two slits arranged opposite to each other comprises cutting each to-be-cut glass substrate along each edge of the bendable region through a laser to form the slit comprising a plurality of sub-slits extending along the first direction and spaced apart from each other.

6. The method according to claim 5, wherein in the cutting each to-be-cut glass substrate along the edge of the bendable region to form the two slits arranged opposite to each other, the laser has power of 30 W to 60 W and a pulse spacing of 1 µm to 6 µm to generate a laser beam at a wavelength of 532 nm to 1064 nm.

7. The method according to claim 5, wherein in the performing the double-sided thinning operation on the large glass sheet and performing the edge etching operation on the edge of the bendable region, the entire large glass sheet is thinned through spraying an acid solution, and the plurality of sub-slits in each slit is in communication with each other.

8. The method according to claim 7, wherein in the performing the double-sided thinning operation on the large glass sheet and performing the edge etching operation on the edge of the bendable region, an angle between a surface and a side surface of the bendable region is a rounded angle.

9. The method according to claim 7, wherein in the performing the double-sided thinning operation on the large glass sheet and performing the edge etching operation on the edge of the bendable region, the acid solution is hydrofluoric acid.

10. The method according to claim 1, wherein the chemical tempering operation is an exchange process of sodium and potassium ions at a high temperature, and surface strength and flexibility of the glass substrate are increased through a squeezing effect generated due to a volume difference between the sodium and potassium ions.

11. The method according to claim 1, wherein the performing the micro-etching treatment on the surface of the chemically-tempered glass substrate comprises performing the micro-etching treatment on the surface of the chemically-tempered glass substrate so as to passivate sharp microcracks on the surface and edge of the glass substrate.

12. An ultra-thin glass substrate manufactured through the method according to claim 1.

13. The ultra-thin glass substrate according to claim 12, wherein a length of the bendable region in the first direction is a distance between a stress starting point and a stress ending point when the to-be-cut glass substrate is bent.

14. The ultra-thin glass substrate according to claim 12, wherein a length of the slit in the first direction is greater than or equal to a length of the bendable region in the first direction.

15. The ultra-thin glass substrate according to claim 14, wherein each of two ends of each slit extend by 8 mm to 12 mm toward the corresponding non-bendable region.

16. The ultra-thin glass substrate according to claim 12, wherein each to-be-cut glass substrate is cut along each edge of the bendable region through a laser to form the slit comprising a plurality of sub-slits extending along the first direction and spaced apart from each other.

17. The ultra-thin glass substrate according to claim 16, wherein the laser has power of 30 W to 60 W and a pulse spacing of 1 µm to 6 µm to generate a laser beam at a wavelength of 532 nm to 1064 nm.

18. The ultra-thin glass substrate according to claim 16, wherein the entire large glass sheet is thinned through spraying an acid solution, and the plurality of sub-slits in each slit is in communication with each other.

19. The ultra-thin glass substrate according to claim 18, wherein an angle between a surface and a side surface of the bendable region is a rounded angle.

20. A display device comprising a cover plate made of the ultra-thin glass substrate according to claim 12.

* * * * *